United States Patent
Sato et al.

(10) Patent No.: US 11,339,002 B2
(45) Date of Patent: May 24, 2022

(54) CONVEYOR BELT

(71) Applicant: NITTA CORPORATION, Osaka (JP)

(72) Inventors: Yuki Sato, Yamatokoriyama (JP); Koki Morimoto, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 17/132,013

(22) Filed: Dec. 23, 2020

(65) Prior Publication Data

US 2021/0198045 A1    Jul. 1, 2021

(30) Foreign Application Priority Data

Dec. 26, 2019    (JP) .............................. JP2019-236511

(51) Int. Cl.
*B65G 15/32*    (2006.01)
*B65G 15/30*    (2006.01)

(52) U.S. Cl.
CPC .................................... *B65G 15/32* (2013.01)

(58) Field of Classification Search
None
See application file for complete search history.

(56) References Cited

U.S. PATENT DOCUMENTS

| 9,733,384 B2* | 8/2017 | Suzuki | ..................... G01V 8/10 |
| 2009/0014289 A1* | 1/2009 | Walter | .................. B65G 15/02 198/847 |

FOREIGN PATENT DOCUMENTS

| JP | 2004264763 A |   | 9/2004 |
| JP | 2006199892 A | * | 8/2006 |
| JP | 2011121688 A | * | 6/2011 |
| JP | 2011121688 A |   | 6/2011 |

* cited by examiner

*Primary Examiner* — Kavel Singh

(74) *Attorney, Agent, or Firm* — Muncy, Geissler, Olds & Lowe, P.C.

(57) ABSTRACT

A conveyor belt makes contamination of the conveyor belt and conveyance objects less noticeable. A conveyor belt has a structure in which a colorless transparent belt body and a black resin layer that exhibits black color are overlaid on each other and is observed as a black belt. The black resin layer is provided on a surface opposite to a carrying surface of the belt body. The black resin layer is formed in black by blending a conductive filler in the resin and is added with conductivity.

3 Claims, 1 Drawing Sheet

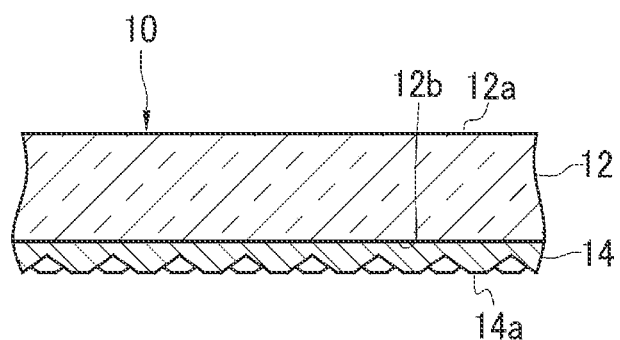

CONVEYOR BELT

CROSS REFERENCE TO RELATED APPLICATIONS

This application claims the benefit of foreign priority to Japanese Patent Application No. 2019-23611, filed on Dec. 26, 2019, which is incorporated by reference in its entirety.

BACKGROUND OF THE INVENTION

Field of the Invention

The present invention relates to a conveyor belt.

Description of the Related Art

A conveyor belt is used to carry conveyance objects such as various goods or cardboard boxes containing goods. The conveyor belt is usually stretched between a pair of pulleys and moves conveyance objects by running in at least one direction. The conveyor belt is generally colored, for example, by blending a resin such as rubber or polyurethane with carbon black or the like.

On the other hand, a belt with electrical conductivity to prevent the electrification of a conveyor belt is known. For example, a belt described in Patent Literature 1 (See Japanese Patent Laid-Open No. 2011-121688) has a transparent conductive film inside or on a surface of a belt body made of a transparent resin or a transparent elastomer, and the belt is transparent. Meanwhile, a belt of Patent Literature 2 (See Japanese Patent Laid-Open No. 2004-264763) consists of a resin blended with a conductive filler, such as carbon black, which gives the belt an electrical conductivity.

SUMMARY OF THE INVENTION

By way of example, the conveyor belt may be contaminated by dust generated by rubbing between the conveyor belt and the conveyance objects, ink or dirt of the conveyance objects, and the ink and dirt may adhere to the conveyor belt. In order to make such dirt less noticeable, a black conveyor belt may be desired. However, when the black conveyor belt is used, rubbing between the conveyor belt and the conveyance objects causes the black color of the conveyor belt to transfer to the conveyance objects, and the conveyance objects may be stained. Also, black wear debris from the conveyor belt is scattered and adheres to the conveyance objects, causing it to be noticeable as a stain on the conveyance objects.

In view of the above circumstances, it is an object of the present invention to provide a conveyor belt in which the dirt is less noticeable and which does not make the dirt of conveyance objects noticeable.

Solution to Problem

A conveyor belt of the present invention has a transparent belt body formed of a resin and a black-colored black resin layer formed of a resin, which is provided on a surface opposite to a carrying surface of the belt body.

Advantageous Effect of the Invention

According to the present invention, because the black-colored black resin layer is observed through the transparent belt body, the conveyor belt is observed as a black belt, so that dirt on the conveyor belt is less noticeable, the color does not transfer from the conveyor belt to the conveyance objects, and wear debris of the belt body generated by rubbing against the conveyance objects, even though adhered to the conveyance objects, may be less noticeable.

BRIEF DESCRIPTION OF THE DRAWING

FIG. 1 is an explanatory drawing illustrating a conveyor belt configuration according to an embodiment.

DETAILED DESCRIPTION OF THE PREFERRED EMBODIMENT

As illustrated in FIG. 1, a conveyor belt 10 in an embodiment includes a colorless transparent belt body 12 and a black resin layer 14 that exhibits black color. The conveyor belt 10 has a structure in which the belt body 12 is overlaid on the black resin layer 14. Thus, the conveyor belt 10 is observed as a black belt from any direction since the black resin layer 14 is observed through the belt body 12.

The conveyor belt 10 described above is joined at both ends to form an endless belt and is used, for example, by being stretched between a drive pulley and a driven pulley. One of surfaces of the belt body 12 is a carrying surface 12a to come into contact with conveyance objects. The conveyor belt 10 carries conveyance objects in a traveling direction, for example, by running with the conveyance objects placed on the carrying surface 12a. For example, the conveyance objects may be carried by making the conveyor belt 10 travel with the conveyance objects interposed between the conveyor belt 10 and a carrying surface of another conveyor belt traveling in parallel with the conveyor belt 10.

The belt body 12 is formed of a resin and is transparent. In this example, the belt body 12 provides tensile strength to the conveyor belt 10. For this reason, the thickness of the belt body 12 is larger than that of the black resin layer 14, as will be described below.

Thermoplastic polyurethane is used as the resin, constituting the belt body 12. The resin constituting the belt body 12 is not limited to the thermoplastic polyurethane, but may be transparent, abrasion-resistant, and elastic, such as vulcanized rubber, polyester elastomer, and the like. The belt body 12 is preferably colorless and transparent but may also have a color tone.

The belt body 12 preferably has a light transmittance of 90% or more in a visible light range. This ensures that the conveyor belt 10 is observed as black by the black resin layer 14 observed through the belt body 12. Also, to adjust the friction between the carrying surface 12a and the conveyance objects, a surface treatment such as forming irregularities on the carrying surface 12a of the belt body 12 may be provided. In this case, the surface of the carrying surface 12a is preferably smooth so that it is observed as black when the conveyor belt 10 is viewed from a belt body 12 side, and a mirror surface, matte (pear skin), or the like, is also preferable.

The black resin layer 14 is provided on a surface 12b of the belt body 12 opposite to the carrying surface 12a of the belt body 12. The black resin layer 14 is formed in black by including a conductive filler in the resin and is a conductive resin layer with added conductivity. In this example, the black resin layer 14 is formed by blending the thermoplastic polyurethane with carbon black. In this example, a surface (opposite surface of the belt body 12) 14a of the black resin layer 14, which comes into contact with the pulleys, is formed with small irregularities to increase a frictional force against the pulleys.

The resin constituting the black resin layer 14 is not particularly limited as long as it has wear-resistance and elasticity, and, for example, polyurethane, vulcanized rubber, polyester elastomers, or the like may be used. For the resin of the belt body 12 and the black resin layer 14, it is preferable to use a thermoplastic material because of the ease of manufacture thereof and the ease of joining the conveyor belt 10 when it is made into an endless belt.

The conductive filler is not specifically limited as long as it can be mixed with the resin to make the resin black and conductive, and, for example, carbon-based materials such as carbon black, carbon nanotubes, carbon fiber, and graphite, as well as oxides such as iron and copper are also applicable. In particular, a carbon-based conductive filler is preferable because of its high conductivity. A surface electrical resistance in the black resin layer 14 is desirably $10^9$ Ω/sq. or less.

The thickness of the above black resin layer 14 is not limited as long as it is black in color and has electrical conductivity, and is formed, for example, smaller than the thickness of the belt body 12. In this example, the thickness of the belt body 12 is 1.0 mm, and the thickness of the black resin layer 14 is on the order of 0.05 mm (0.2 mm if the surface irregularities are included).

The conveyor belt 10 may be manufactured by any method that does not cause the belt body 12 and the black resin layer 14 to delaminate. For example, in the case of manufacturing by the extrusion lamination method, a melted resin blended with a conductive filler is spread over, for example, a fabric material whose surface has been applied with a release treatment (or release paper or the like) to form the black resin layer 14. Onto the surface of the black resin layer 14 on the fabric material, a melted raw material of the belt body 12 is fed by being extruded from an extruder into a film-state, then the belt body 12 and the black resin layer 14 are fed into a cooling roller for lamination. The belt body 12 and the black resin layer 14 formed integrally in this manner are released from the fabric material and made into the conveyor belt 10.

In the conveyor belt 10 configured as described above, since the conveyance objects are placed on the belt body 12 formed of a transparent resin, rubbing occurs between the conveyance objects and the transparent belt body 12. Therefore, there is no color transfer from the conveyor belt 10 to the conveyance objects. Furthermore, even if rubbing that occurs between the conveyor belt 10 and the conveyance objects generates wear debris of the belt body 12, the wear debris is generated from the transparent belt body 12, and thus is not noticeable as the dirt of conveyance objects even if it adheres to the conveyance objects.

Moreover, the conveyor belt 10 configured as described above is observed as a black belt in its entirety because the black resin layer 14 is observed through the colorless transparent belt body 12. Accordingly, adherence of dust generated by rubbing against the conveyance objects, or adherence of ink or dirt of the conveyance objects to the conveyor belt 10 due to rubbing therebetween, if any, will not be noticeable as the case of the conventional black conveyor belt.

The black resin layer 14 in this example has conductivity with a conductive filler so that electrification of the conveyor belt 10 is prevented. Therefore, the conveyor belt 10 does not adsorb wear debris of the belt body 12 or dust generated by rubbing between the conveyor belt 10 and the conveyance objects. Furthermore, since electrification of the conveyor belt 10 is prevented, there is no electrical discharge or the like associated with the electrification, and thus malfunctioning of the equipment is prevented.

Although the above is a configuration in which the black resin layer of the conveyor belt is conductive, the configuration may be simply black without providing the black resin layer with conductivity. In this case, a filler that simply colors the resin black can be used as the filler.

What is claimed is:

1. A conveyor belt comprising:
   a transparent belt body formed of a resin, and
   a black-colored black resin layer formed of a resin and provided on a surface opposite to a carrying surface of the belt body.

2. The conveyor belt according to claim 1, wherein the black resin layer is a conductive resin layer containing the resin and a conductive filler to make the resin black.

3. The conveyor belt according to claim 1, wherein the belt body has a light transmittance of 90% or more in a visible light range.

* * * * *